US011714395B2

(12) United States Patent
Morita et al.

(10) Patent No.: US 11,714,395 B2
(45) Date of Patent: Aug. 1, 2023

(54) MOTOR CONTROL DEVICE

(71) Applicant: FANUC CORPORATION, Yamanashi (JP)

(72) Inventors: Yuuki Morita, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/279,051

(22) Filed: Feb. 19, 2019

(65) Prior Publication Data

US 2019/0302727 A1    Oct. 3, 2019

(30) Foreign Application Priority Data

Mar. 30, 2018    (JP) ................................ 2018-066771

(51) Int. Cl.
     *G05B 19/404*      (2006.01)
     *B23Q 17/09*      (2006.01)

(52) U.S. Cl.
     CPC ....... *G05B 19/404* (2013.01); *B23Q 17/0952* (2013.01); *G05B 2219/37355* (2013.01); *G05B 2219/49061* (2013.01); *G05B 2219/49108* (2013.01)

(58) Field of Classification Search
     CPC ........ G05B 19/404; G05B 2219/37355; B23Q 17/0952
     USPC .................................................. 318/632, 619
     See application file for complete search history.

(56) References Cited

U.S. PATENT DOCUMENTS

| 2009/0009128 A1* | 1/2009 | Okita | .................... G05B 13/024 |
| | | | 318/619 |
| 2009/0097830 A1* | 4/2009 | Iwashita | ............. H02P 23/0004 |
| | | | 388/800 |
| 2016/0008938 A1* | 1/2016 | Li | ....................... G05B 19/4065 |
| | | | 318/565 |
| 2020/0169206 A1* | 5/2020 | Grabs | ................. B60L 15/2009 |

FOREIGN PATENT DOCUMENTS

| JP | 56-33256 | 4/1981 |
| JP | 60-232853 | 11/1985 |
| JP | 62-193749 | 8/1987 |
| JP | 2016-16492 | 2/2016 |
| WO | 2013/088849 | 6/2013 |

* cited by examiner

*Primary Examiner* — Kawing Chan
*Assistant Examiner* — Zemenay T Truneh
(74) *Attorney, Agent, or Firm* — Wenderoth, Lind & Ponack L.L.P.

(57) ABSTRACT

A motor control device is a motor control device which controls a spindle motor of a machine tool, the device including: a low-pass filter which averages torque command values or drive current values of the spindle motor and calculates averaged load information of the spindle motor; and a time constant calculation unit which calculates, as a time constant of the low-pass filter, a first time constant based on a cut-off frequency according to the rotation number of the spindle driven by the spindle motor, or a second time constant based on a cut-off frequency according to a value produced by multiplying a of cutting tooth number of a tool by the rotation number of the spindle.

9 Claims, 4 Drawing Sheets

MOTOR CONTROL DEVICE

This application is based on and claims the benefit of priority from Japanese Patent Application No. 2018-066771, filed on 30 Mar. 2018, the content of which is incorporated herein by reference.

BACKGROUND OF THE INVENTION

Field of the Invention

The present invention relates to a motor control device which controls a spindle motor of a machine tool.

Related Art

As a machine tool, there are machines which perform cutting of a workpiece, for example, by rotationally driving a tool by way of a spindle motor. With such machine tools, the load on the spindle motor fluctuates during machining. When the load fluctuation (machining disturbance) of the spindle motor is large, a machining abnormality in the workpiece or an abnormality in the machine tool (for example, tool) may arise. On the other hand, when the load fluctuation (machining disturbance) of the spindle motor is small, the machining time lengthens.

Therefore, with a numerical control device, for example, it has been considered to control machining conditions (for example, feed rate (feed speed) of the feed axis) automatically in response to the load information of the spindle motor (for example, refer to Patent Document 1). Alternatively, it has been considered to display the load information of the spindle motor with the numerical control device, for example. It is thereby possible for an operator of the machine tool to control the machining conditions manually in response to the load information displayed. For example, when the load fluctuation (machining disturbance) of the spindle motor is large, it is possible to suppress the occurrence of machining abnormality in the workpiece or abnormality in the machine tool (for example, tool), by lowering the feed rate of the feed axis. On the other hand, when the load fluctuation (machining disturbance) of the spindle motor is small, it is possible to shorten the machining time by raising the feed rate of the feed axis.

Patent Document 1: PCT International Publication No. WO2013/088849

SUMMARY OF THE INVENTION

When the load fluctuation (machining disturbance) of the spindle motor is too large, for example, automatic control of the feed rate of the feed axis by the numerical control device becomes difficult. In addition, the load information displayed by the numerical control device fluctuates, for example, and thus manual control of the feed rate of the feed axis by the operator of a machine tool becomes difficult.

Concerning this point, it has been considered to average the load fluctuation (machining disturbance) of the spindle motor using a filter. However, according to the knowledge of the present inventors, it is necessary to increase the time constant in order to sufficiently suppress the load fluctuation (machining disturbance) of the spindle motor using a first-order filter that is commonly known, and the responsiveness of control of machining conditions (for example, feed rate of the feed axis) will decline.

The present invention has an object of providing a motor control device which suppresses fluctuation of load information of a spindle motor, and in the case of performing control of machining conditions, is capable of suppressing a decline in responsiveness thereof.

(1) A motor control device (e.g., the motor control device 1 described later) according to the present invention is a motor control device for controlling a spindle motor (e.g., the spindle motor 3 described later) which rotationally drives a tool or workpiece in a machine tool, the device including: a first low-pass filter (e.g., the first low-pass filter 24 described later) which averages torque command values or drive current values of the spindle motor and calculates averaged first load information of the spindle motor; and a time constant calculation unit (e.g., the time constant calculation unit 22 described later) which calculates, as a time constant of the first low-pass filter, a first time constant based on a cut-off frequency according to a rotation number of the spindle driven by the spindle motor, or in a case of the spindle rotationally driving the tool, a second time constant based on a cut-off frequency according to a value produced by multiplying a number of cutting tooth of the tool by the rotation number of the spindle.

(2) In the motor control device as described in (1), the time constant calculation unit may calculate the first time constant so that the cut-off frequency of the first low-pass filter becomes no more than the rotation number of the spindle, or the second time constant so that the cut-off frequency becomes no more than a value produced by multiplying a number of cutting tooth of the tool by the rotation number of the spindle.

(3) The motor control device as described in (1) or (2) may further include: a second low-pass filter (e.g., the second low-pass filter 26 described later) which averages the torque command values or drive current values of the spindle motor, and calculates averaged second load information of the spindle motor, in which the time constant of the second low-pass filter may be fixed irrespective of the rotation number of the spindle, and is larger than the time constant of the first low-pass filter, and the time constant of the first low-pass filter may be variable according to the rotation number of the spindle.

(4) In the motor control device as described in any of (1) to (3), the rotation number of the spindle may be a speed command value or speed feedback value of the spindle.

(5) in the motor control device as described in any of (1) to (4), the time constant calculation unit may switch between setting the first time constant as the time constant of the first low-pass filter, or setting the second time constant as the time constant of the first low-pass filter, so that the magnitude of fluctuation of the first load information becomes smaller.

(6) In the motor control device as described in (5), the time constant calculation unit may switch between setting the first time constant as the time constant of the first low-pass filter, or setting the second time constant as the time constant of the first low-pass filter, based on the magnitude of fluctuation of the first load information.

(7) In the motor control device as described in (5), the time constant calculation unit may switch between setting the first time constant as the time constant of the first low-pass filter, or setting the second time constant as the time constant of the first low-pass filter, based on an external command.

According to the present invention, it is possible to provide a motor control device which suppresses fluctuation in load information of a spindle motor, and in the case of performing control of machining conditions, can suppress a decline in the responsiveness thereof.

DETAILED DESCRIPTION OF THE INVENTION

Hereinafter, an example of an embodiment of the present invention will be explained by referencing the attached drawings. It should be noted that the same reference symbols shall be attached to identical or corresponding portions in the respective drawings.

Figure 1:
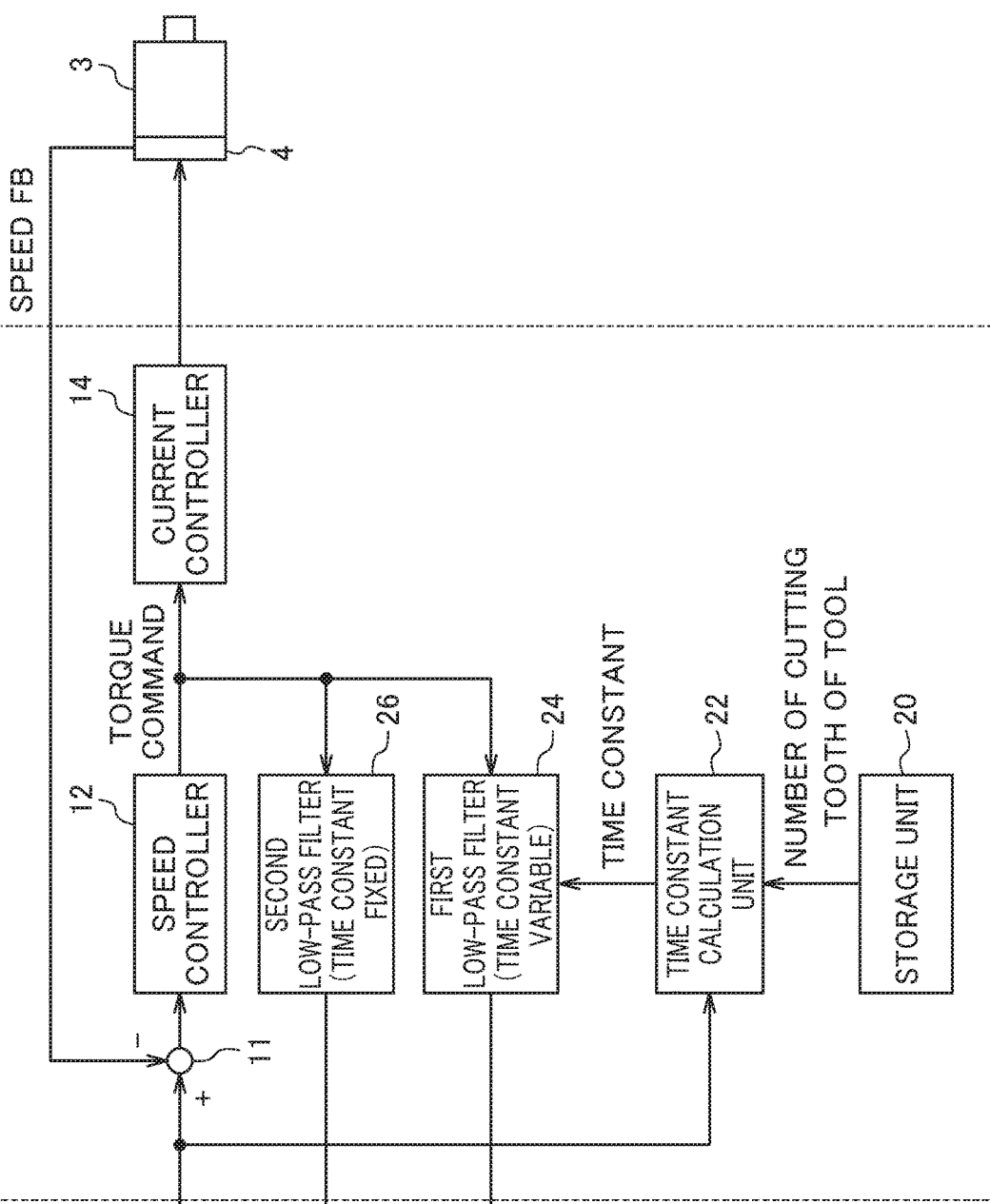
FIG. 1 is a view showing a control system including a motor control device according to the present embodiment.

FIG. 1 is a view showing a control system including a motor control device according to the present embodiment. The control system shown in FIG. 1 includes a motor control device 1 and a numerical control device 2, and controls a spindle motor 3 and feed axis motor (not shown) of a machine tool.

The spindle motor 3 rotationally drives a tool in the machine tool which performs cutting on a workpiece, for example. An encoder 4 which detects the rotation speed (rotation number) of the spindle driven by the spindle motor 3, for example, is provided to the spindle motor 3. The detected speed is used as a speed feedback value (speed FB).

The numerical control device 2 calculates a speed command value (rotation number) of the spindle driven by the spindle motor 3 based on a machining program, and supplies the calculated speed command value to the motor control device 1. In addition, the numerical control device 2 may acquire first load information of the spindle motor 3 from the motor control device 1, and control the machining conditions (for example, feed rate of the feed axis) automatically according to the acquired first load information. In addition, the numerical control device 2 may acquire second load information of the spindle motor 3 from the motor control device 1, and display the acquired second load information on a display unit. The operator of the machine tool can thereby control the machining conditions manually according to the displayed second load information. For example, when the load fluctuation (machining disturbance) of the spindle motor 3 is large, it is possible to suppress the occurrence of machining abnormality in a workpiece or the occurrence of abnormality in the machine tool (for example, tool) by lowering the feed rate of the feed axis. On the other hand, when the load fluctuation (machining disturbance) of the spindle motor 3 is small, it is possible to shorten the machining time by raising the feed rate of the feed axis.

The motor control device 1 controls the spindle by controlling the spindle motor 3, based on the speed command value calculated by the numerical control device 2. The motor control device 1 includes a subtracter 11, a speed controller 12 and a current controller 14. The subtracter 11 obtains the error between the speed command value and the speed feedback value detected by the encoder 4. The speed controller 12 calculates a torque command value of the spindle motor 3, based on the error obtained by the subtracter 11. The current controller 14 calculates a drive current value for driving the spindle motor 3 based on the torque command value calculated by the speed controller 12, and supplies the calculated drive current value to the spindle motor 3.

Furthermore, the motor control device 1 includes a storage unit 20, time constant calculation unit 22, first low-pass filter 24 and second low-pass filter 26. The storage unit 20 stores the number of cutting tooth of the tool as tool information. The storage unit 20 is rewritable memory such as EEPROM, for example.

The time constant calculation unit 22 acquires the speed command value supplied from the numerical control device 2, and acquires the number of cutting tooth of the tool stored in the storage unit 20. The time constant calculation unit 22 calculates a time constant of the first low-pass filter 24. Specifically, the time constant calculation unit 22 calculates, as the time constant T, the first time constant based on the cut-off frequency according to the rotation number of the spindle which is driven by the spindle motor 3. More specifically, the time constant calculation unit 22 calculates the time constant (first time constant) T by way of Formula (1-1) and Formula (1-2) below, so that the cut-off frequency Fc (/s) of the first low-pass filter 24 becomes no more than the rotation number Vcmd (rev/s) of the spindle indicated by the speed command value (i.e. frequency of machining disturbance described later).

$$T = 1/(2\pi \times Fc) \tag{1-1}$$

$$Fc \leq Vcmd \tag{1-2}$$

Alternatively, the time constant calculation unit 22 calculates, as the time constant T, a second time constant based on the cut-off frequency according to a value produced by multiplying the number of cutting tooth of the tool by the rotation number of the spindle which is driven by the spindle motor 3. More specifically, the time constant calculation unit 22 calculates the time constant (second time constant) T, according to the Formula (2-1) and Formula (2-2) below, so that the cut-off frequency Fc (/s) of the first low-pass filter 24 becomes no more than a value produced by multiplying the number of cutting tooth N of the tool by the rotation number Vcmd (rev/s) of the spindle (i.e. frequency of machining disturbance described later) indicated by the speed command value.

$$T = 1/(2\pi \times Fc) \tag{2-1}$$

$$Fc \leq Vcmd \times N \tag{2-2}$$

The time constant calculation unit 22 switches between setting the first time constant calculated according to the above Formula (1-1) and Formula (1-2) as the time constant T of the first low-pass filter 24, or setting the second time constant calculated according to the above Formula (2-1) and Formula (2-2) as the time constant T of the first low-pass filter 24, so that the magnitude of fluctuation (machining disturbance) of the first load information which was averaged by the first low-pass filter 24 becomes smaller. For example, the time constant calculation unit 22 may automatically perform switching of the above-mentioned time constant T, based on the magnitude of fluctuation of the first load information which was averaged by the first low-pass filter 24. In this case, the time constant calculation unit 22, for example, may be based on the magnitude of the amplitude of first load information, or may be based on the magnitude of the fluctuation frequency component by FFT analyzing the first load information. Alternatively, the time constant calculation unit 22 may perform switching of the above-mentioned time constant T based on an external command. The external command may be supplied from the numerical control device 2. In this case, the numerical control device 2 may automatically determine the magnitude of the fluctuation in first load information in the aforementioned way, for example, based on the magnitude of the amplitude of first load information, or the magnitude of the fluctuation frequency component after FFT analyzing the first load information. Alternatively, the external command may be inputted manually by the operator. In this case, the operator may determine visually the magnitude of the fluctuation in load information, based on the magnitude of the amplitude of the load information displayed on the numerical control device 2.

It should be noted that the tool information is stored in the storage unit of the numerical control device 2, and the time constant calculation unit 22 may acquire the tool information from the numerical control device 2. In this case, the storage unit 20 may not be provided. In addition, the time constant calculation unit 22 may use a speed feedback value detected by the encoder 4, in place of the speed command value.

The first low-pass filter 24 averages the torque command values of the spindle motor 3 by a time constant calculated by the time constant calculation unit 22, and calculates averaged first load information of the spindle motor 3. A second low-pass filter 26 averages the torque command value of the spindle motor 3 by a predetermined time constant, and calculates averaged second load information of the spindle motor 3. The time constant of the first low-pass filter 24 is variable according to the rotation number of the spindle as mentioned above. On the other hand, the time constant of the second low-pass filter 26 is fixed irrespective of the rotation number of the spindle. The predetermined time constant of the second low-pass filter 26 is set larger than the time constant of the first low-pass filter 24. In other words, the cut-off frequency of the second low-pass filter 26 is set smaller than the cut-off frequency of the first low-pass filter 24. It should be noted that the first low-pass filter 24 and second low-pass filter 26 may use the drive current value of the spindle motor 3 calculated by the current controller 14 in place of the torque command value.

The motor control device 1 and numerical control device 2, for example, are configured by an arithmetic processor such as DSP (Digital Signal Processor) and FPGA (Field-Programmable Gate Array). The various functions of the motor control device 1 and numerical control device 2 are realized by executing predetermined software (program) stored in a storage unit, for example. Various functions of the motor control device 1 and numerical control device 2 may be realized by cooperation between hardware and software, and may be realized by only hardware (electronic circuits).

Figure 2:
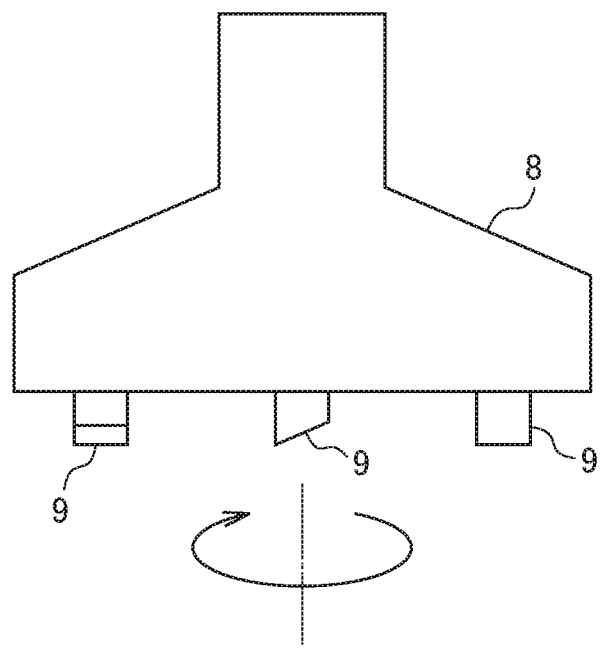
FIG. 2 is a side view of an example of a tool.
Figure 3:
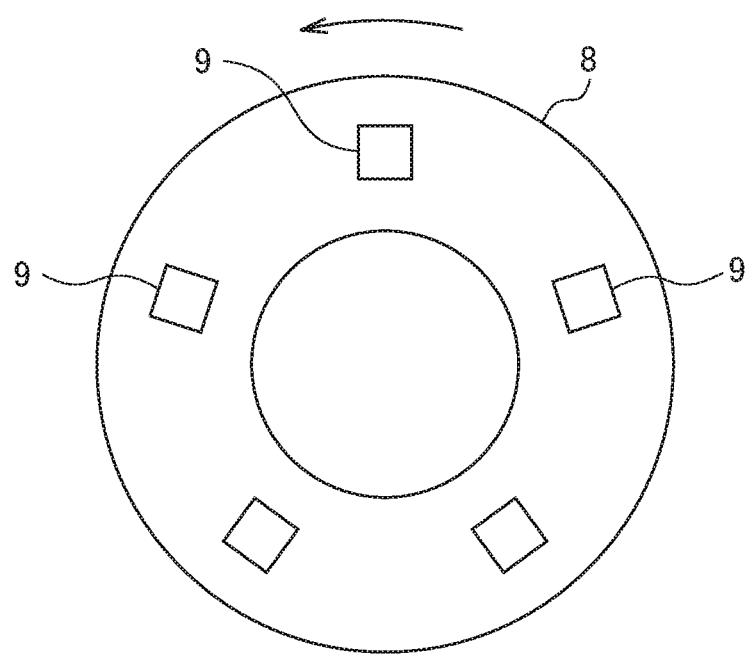
FIG. 3 is a plan view of an example of a tool.

Next, a tool which is rotationally driven by the spindle motor 3 (i.e. spindle) will be explained. FIG. 2 is a side view of an example of a tool, and FIG. 3 is a plan views of an example of a tool. The tool 8 shown in FIGS. 2 and 3 includes five cutting tooth 9 relative to the rotary axis in the arrow direction, and is rotationally driven in the arrow direction by the spindle driven by the spindle motor 3. With such a tool 8, (i) load fluctuation (machining disturbance) of the spindle motor 3 occurs at the period of ⅕ times of 1 rotation of the spindle (frequency of 5 times), caused by each cutting teeth 9 contacting the workpiece;

(ii) Load fluctuation (machining disturbance) of the spindle motor 3 occurs at the period of 1 rotation of the spindle, caused by the five cutting tooth 9 being arranged eccentrically relative to the rotary axis; or (iii) Load fluctuation (machining disturbance) of the spindle motor 3 occurs at the period of ⅕ times of 1 rotation of the spindle (frequency of 5 times), caused by any of the five cutting tooth 9 being arranged eccentrically relative to the rotary axis.

When the load of the spindle motor 3 fluctuates in this way, automatic control of the feed axis feed rate by the numerical control device 2, for example, becomes difficult as mentioned above. In addition, the load information displayed by the numerical control device 2 fluctuates, for example, and manual control of the feed axis feed rate by the operator of the machine tool becomes difficult.

Therefore, it has been considered to average the load fluctuation (machining disturbance) of the spindle motor 3 using a filter. However, according to the knowledge of the present inventors, it is necessary to increase the time constant in order to sufficiently suppress the load fluctuation (machining disturbance) of the spindle motor 3 using a first-order filter (time constant fixed) that is commonly known, and the responsiveness of control of machining conditions (for example, feed rate of feed axis) will decline. On the other hand, When making the time constant of the first-order filter too small, depending on the machining conditions, control well become unstable by the influence of load fluctuation (machining disturbance), and the fluctuation (variation) in load display increases.

Concerning this point, according to the motor control device 1 of the present embodiment, the first time constant (above-mentioned Formula (1-1) and Formula (1-2)) such that the cut-off frequency of the first low-pass filter 24 becomes no more than the rotation number of the spindle, or the second time constant (above-mentioned Formula (2-1) or Formula (2-2)) such that the cut-off frequency becomes no more than a value produced by multiplying the number of cutting tooth of the tool 8 by the rotation number of the spindle, is set as the time constant of the first low-pass filter 24. In other words, the time constant of the first low-pass filter 24 is set so that the cut-off frequency of the first low-pass filter 24 is no more than the frequency of the load fluctuation (machining disturbance) of the spindle motor 3 caused by the above-mentioned (i) to (iii). It is thereby possible to suppress fluctuation in the first load information of the spindle motor 3. In addition, it is possible to shorten the delay time of first load information, and the decline in responsiveness thereof in the case of performing control of the machining conditions is suppressible.

Furthermore, according to the motor control device 1 of the present embodiment, the time constant calculation unit 22 can switch between setting the first time constant calculated by the above-mentioned Formula (1-1) and Formula (1-2) as the time constant T of the first low-pass filter 24, or setting the second time constant calculated by the above-mentioned Formula (2-1) and Formula (2-2) as the time constant T of the first low-pass filter 24, so that the magnitude of fluctuation in the first load information (machining disturbance) averaged by the first low-pass filter 24 becomes smaller. For example, the above-mentioned (i) load fluctuation (machining disturbance) of the spindle motor 3 caused by each cutting teeth 9 contacting the workpiece, and (iii) the load fluctuation (machining disturbance) of the spindle motor 3 caused by any of the five cutting tooth 9 being arranged eccentrically relative to the rotary axis are suppressible by either the first low-pass filter 24 of the time constant (First time constant) T calculated by the above-mentioned Formula (1-1) and Formula (1-2), and first low-pass filter 24 of the time constant (second time constant) calculated by the above-mentioned Formula (2-1) and Formula (2-2). On the other hand, the above-mentioned (ii) load fluctuation (machining disturbance) of the spindle motor 3 caused by five cutting tooth 9 being arranged eccentrically relative to the rotary axis cannot be suppressed by the first low-pass filter 24 of the time constant (second time constant) T calculated by the above-mentioned Formula (2-1) and Formula (2-2); however, it is suppressible by the first low-pass filter 24 of the time constant (first time constant) calculated by the above-mentioned Formula (1-1) and Formula (1-2). In this case, the time constant calculation unit 22 may switch so as to calculate the time constant (first time constant) calculated by the above-mentioned Formula (1-1) and Formula (1-2) as the time constant of the first low-pass filter 24. Hereinafter, the effects thereof will be verified.

Figure 4:
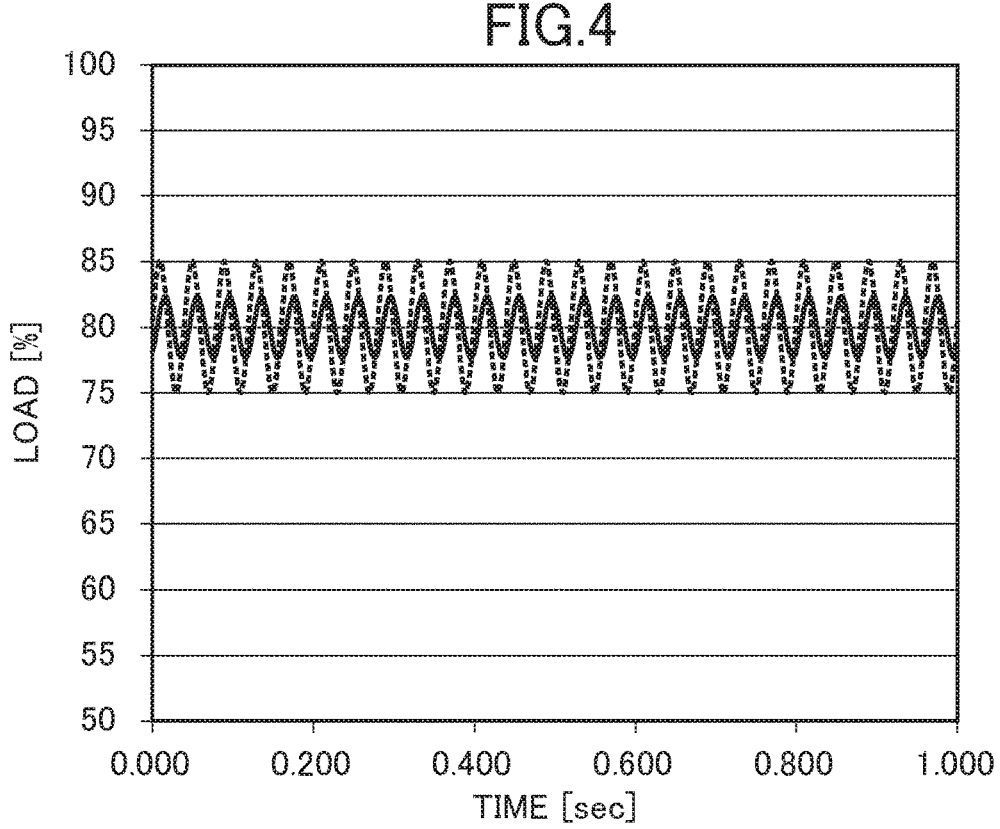
FIG. 4 is a graph showing observation results of a torque command value inputted to a first low-pass filter (dotted line), and first load information outputted from the first low-pass filter (solid line)
Figure 5:
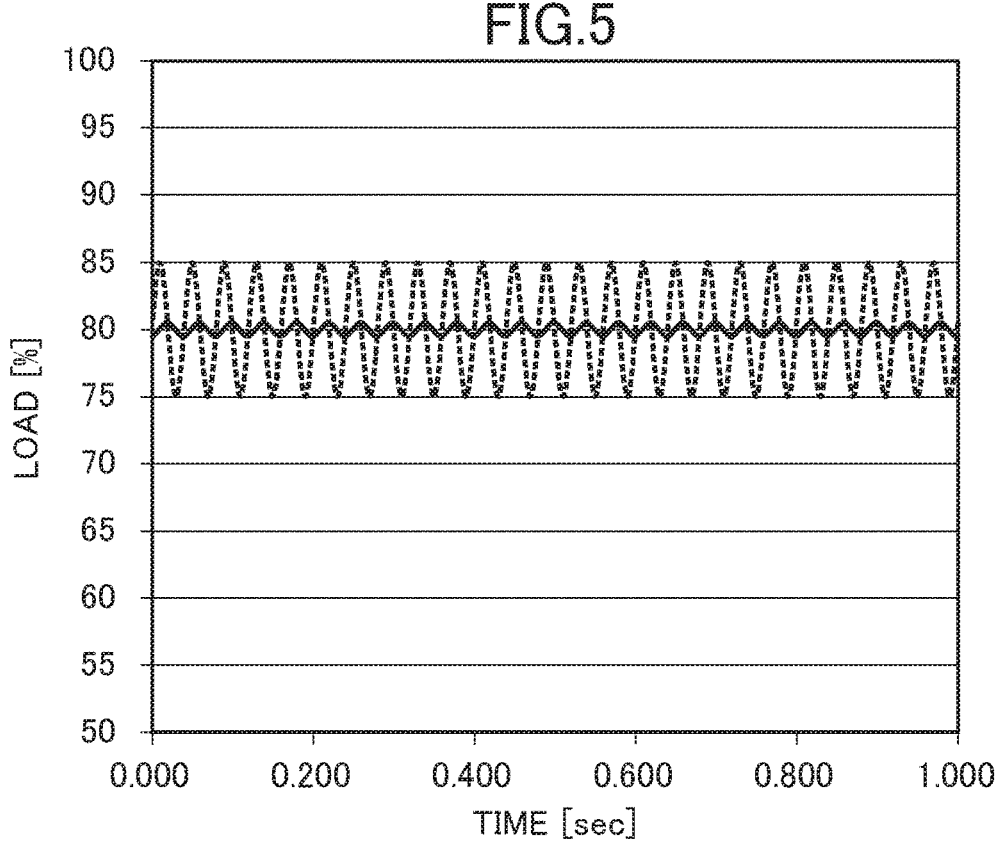
FIG. 5 is a graph showing observation results of a torque command value inputted to a first low-pass filter (dotted line), and first load information outputted from the first low-pass filter (solid line)

FIGS. 4 to 7 are graphs showing observation results of the torque command value inputted to the first low-pass filter 24 (dotted line) and first load information outputted from the first low-pass filter 24 (solid line). The observation conditions of FIGS. 4 to 7 are as follows.

rotation number of spindle Vcmd=300 min$^{-1}$
i.e. frequency caused by 1 rotation of spindle=5 Hz
Number of cutting tooth of tool 8 N=5
i.e, frequency caused by number of cutting tooth N of tool 8=25 Hz Average load of spindle motor 3=80%
In FIGS. 4 and 5
no fluctuation caused by 1 rotation of spindle, and
fluctuation caused by number N of tool 8 is 5%.

In FIG. 4, the time constant of the first low-pass filter 24 was set to the time constant calculated in the above-mentioned Formula (2-1) and Formula (2-2) as Fc=Vcmd×N/2 (second time constant), and in FIG. 5, the time constant of the first low-pass filter 24 was set to the time constant calculated in the above-mentioned Formula (1-1) and Formula (1-2) as Fc=Vcmd/2. According to FIGS. 4 and 5, the fluctuation caused by the number of cutting tooth N of the tool 8 is not as much as the first low-pass filter 24 of the time constant calculated by the above-mentioned Formula (1-1) and Formula (1-2) (first time constant); however, it is found that there is a certain extent of suppression effect by the first low-pass filter 24 of the time constant calculated by the above-mentioned Formula (2-1) and Formula (2-2) (second time constant). In other words, the above-mentioned (i) load fluctuation (machining disturbance) of the spindle motor 3 caused by each cutting teeth 9 contacting the workpiece is suppressed by either of the first low-pass filter 24 of the time constant (first time constant) calculated by the above-mentioned Formula (1-1) and Formula (1-2), and the first low-pass filter 24 of the time constant (second time constant) calculated by the above-mentioned Formula (2-1) and Formula (2-2).

Figure 6:
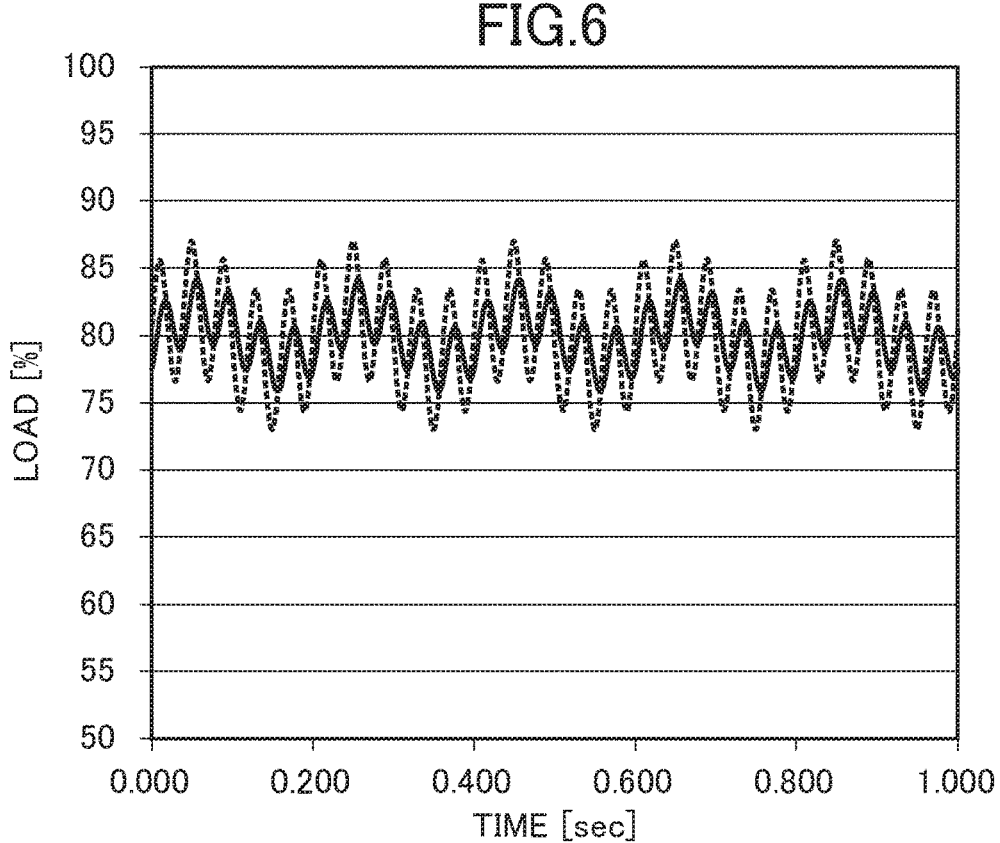
FIG. 6 is a graph showing observation results of a torque command value inputted to a first low-pass filter (dotted line), and first load information outputted from the first low-pass filter (solid line)
Figure 7:
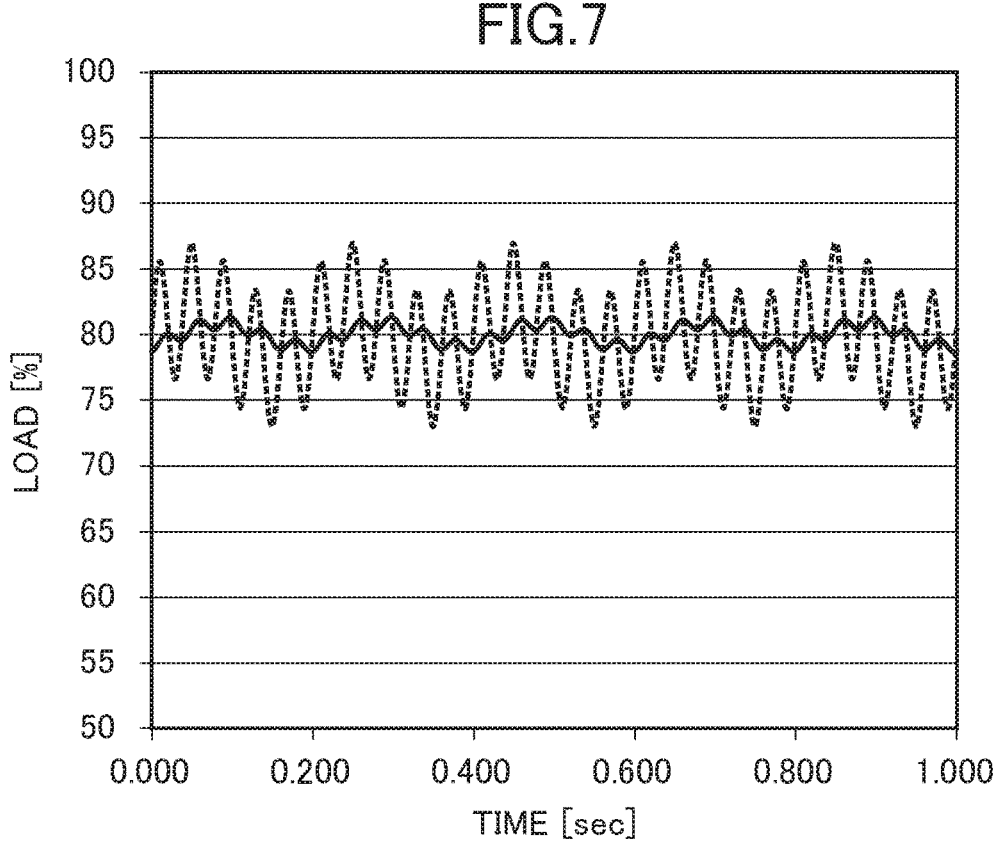
FIG. 7 is a graph showing observation results of a torque command value inputted to a first low-pass filter (dotted line), and first load information outputted from the first low-pass filter (solid line).

Next, further to FIGS. 4 and 5, in FIGS. 6 and 7, the fluctuation caused by 1 rotation of the spindle is 2%. In FIG. 6, the time constant of the first low-pass filter 24 was set to the time constant (second time constant) calculated in the above-mentioned Formula (2-1) and Formula (2-2) as Fc=Vcmd×N/2, and in FIG. 7, the time constant of the first low-pass filter 24 was set to the time constant (first time constant) calculated in the above-mentioned Formula (1-1) and Formula (1-2) as Fc=Vcmd/2. According to FIGS. 6 and 7, it is found that the fluctuation caused by 1 rotation of the spindle is not suppressed by the first low-pass filter 24 of the time constant (second time constant) calculated by the above-mentioned Formula (2-1) and Formula (2-2); however, it is suppressed by the first low-pass filter 24 of the time constant (first time constant) calculated by the above-mentioned Formula (1-1) and Formula (1-2). In other words, it is found that the above-mentioned (ii) load fluctuation (machining disturbance) of the spindle motor 3 caused by five cutting tooth 9 being arranged eccentrically relative to the rotary axis is not suppressed by the first low-pass filter 24 of the time constant (second time constant) calculated by the above-mentioned Formula (2-1) and Formula (2-2); however, it is suppressed by the first low-pass filter 24 of the time constant (first time constant) calculated by the above-mentioned Formula (1-1) and Formula (1-2).

Furthermore, according to the motor control device of the present embodiment, first load information is calculated by the first low-pass filter 24, and second load information is calculated by the second low-pass filter 26. The time constant of the second low-pass filter 26 is fixed irrespective of the rotation number of the spindle, and is larger than the time constant of the first low-pass filter 24. The fluctuation of the second load information is thereby smaller than the fluctuation of the first load information. According to this, by using the first load information in the control of the machining conditions, it is possible to suppress a decline in the responsiveness thereof. On the other hand, by using the second load information having passed through the second low-pass filter 26 having a larger time constant, in display rather than in the control of machining conditions, it is possible to suppress a decline in perceptibility. As a result thereof, both the suppression of a decline in responsiveness thereof in the case of performing control of the machining conditions, and the suppression of a decline in perceptibility in the case of performing display of load information of a spindle motor are possible.

Although an embodiment of the present invention has been explained above, the present invention is not to be limited to the aforementioned embodiment, and various changes and modifications thereto are possible. For example, the aforementioned embodiment exemplifies the motor control device 1 which calculates load information of the spindle motor 3, in which the spindle motor 3 (spindle) rotationally drives a tool. However, the features of the present invention is not limited thereto, and are also applicable to a motor control device 1 which calculates load information of the spindle motor 3, in which the spindle motor 3 (spindle) rotationally drives the workpiece. In this case, the first time constant (above-mentioned Formula (1-1) and Formula (1-2)) based on the cut-off frequency according to the rotation number of the spindle driven by the spindle motor 3 is set as the time constant of the first low-pass filter 24. It is thereby possible to suppress load fluctuation (machining disturbance) of the spindle motor 3 occurring at the period of 1 rotation of the spindle driven by the spindle motor 3, caused by the workpiece being arranged eccentrically relative to the rotary axis (corresponding to above-mentioned (ii)).

In addition, the aforementioned embodiment exemplifies the motor control device 1 which calculates load information of the spindle motor 3 rotationally driving a tool which includes five cutting tooth. However, the features of the present invention are not limited thereto, and are applicable to a motor control device which cutting tooth load information of the spindle motor 3 rotationally driving a tool which includes two or more cutting tooth.

In addition, the aforementioned embodiment exemplifies the motor control device 1 which performs speed control based on a speed command value from the numerical control device 2. However, the features of the present invention are not limited thereto, and are also applicable to a motor control device which performs position control based on a position command value from a numerical control device.

EXPLANATION OF REFERENCE NUMERALS 1 motor control device
2 numerical control device
3 spindle motor
4 encoder
8 tool
9 cutting teeth
11 subtracter
12 speed controller
14 current controller
20 storage unit
22 time constant calculation unit
21 first low-pass filter
26 second low-pass filter

What is claimed is:

1. A motor control device for controlling a spindle motor which rotationally drives a tool or workpiece in a machine tool, the motor control device comprising:
   a first low-pass filter which averages torque command values or drive current values of the spindle motor and calculates averaged first load information of the spindle motor;
   a time constant calculation unit configured to calculate, as a time constant of the first low-pass filter, a first time constant based on a cut-off frequency according to a rotation number of a spindle driven by the spindle motor, and in a case of the spindle rotationally driving the tool, a second time constant based on a cut-off frequency according to a value produced by multiplying a number of cutting teeth of the tool by the rotation number of the spindle; and
   a second low-pass filter which averages the torque command values or drive current values of the spindle motor, and calculates averaged second load information of the spindle motor,
   wherein a time constant of the second low-pass filter is larger than the time constant of the first low-pass filter,
   wherein a fluctuation of the second load information of the spindle motor is smaller than a fluctuation of the first load information of the spindle motor due to the time constant of the first low-pass filter and the time constant of the second low-pass filter, and
   wherein the first load information of the spindle motor is used for controlling machining conditions of the spindle motor so as to suppress a decline in responsiveness of control of the machining conditions.

2. The motor control device according to claim 1, wherein the time constant calculation unit is configured to calculate the first time constant so that the cut-off frequency of the first low-pass filter becomes no more than the rotation number of the spindle, and the second time constant so that the cut-off frequency becomes no more than the value produced by multiplying the number of cutting teeth of the tool by the rotation number of the spindle.

3. The motor control device according to claim 1, wherein the rotation number of the spindle is a speed command value or speed feedback value of the spindle.

4. The motor control device according to claim 1, wherein the time constant calculation unit is configured to switch between setting the first time constant as the time constant of the first low-pass filter, and setting the second time constant as the time constant of the first low-pass filter, so that a magnitude of fluctuation of the first load information becomes smaller.

5. The motor control device according to claim 4, wherein the time constant calculation unit is configured to switch between setting the first time constant as the time constant of the first low-pass filter, and setting the second time constant as the time constant of the first low-pass filter, based on the magnitude of fluctuation of the first load information.

6. The motor control device according to claim 4, wherein the time constant calculation unit is configured to switch between setting the first time constant as the time constant of the first low-pass filter, and setting the second time constant as the time constant of the first low-pass filter, based on an external command.

7. A motor control device for controlling a spindle motor which rotationally drives a tool or workpiece in a machine tool, the motor control device comprising:
   a first low-pass filter which averages torque command values or drive current values of the spindle motor and calculates averaged first load information of the spindle motor;
   a time constant calculation unit configured to calculate, as a time constant of the first low-pass filter, a first time constant based on a cut-off frequency according to a rotation number of a spindle driven by the spindle motor, and in a case of the spindle rotationally driving the tool, a second time constant based on a cut-off frequency according to a value produced by multiplying a number of cutting teeth of the tool by the rotation number of the spindle; and
   a second low-pass filter which averages the torque command values or drive current values of the spindle motor, and calculates averaged second load information of the spindle motor,
   wherein a time constant of the second low-pass filter is larger than the time constant of the first low-pass filter, and
   wherein the time constant calculation unit is configured to switch between setting the first time constant as the time constant of the first low-pass filter, and setting the second time constant as the time constant of the first low-pass filter, so that a magnitude of fluctuation of the first load information becomes smaller.

8. The motor control device according to claim 7, wherein the time constant calculation unit is configured to switch between setting the first time constant as the time constant of the first low-pass filter, and setting the second time constant as the time constant of the first low-pass filter, based on the magnitude of fluctuation of the first load information.

9. The motor control device according to claim 7, wherein the time constant calculation unit is configured to switch between setting the first time constant as the time constant of the first low-pass filter, and setting the second time constant as the time constant of the first low-pass filter, based on an external command.

* * * * *